UNITED STATES PATENT OFFICE.

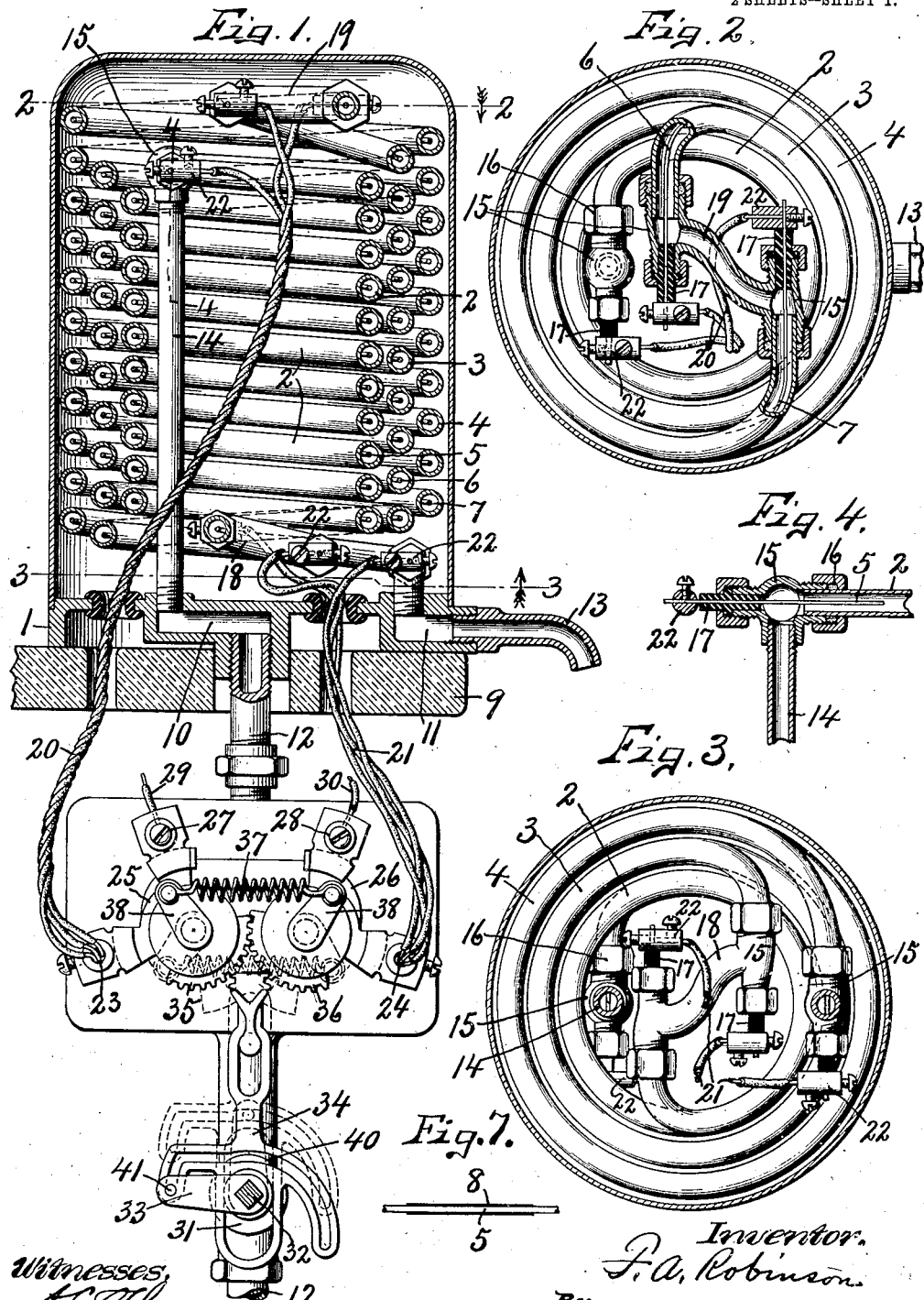

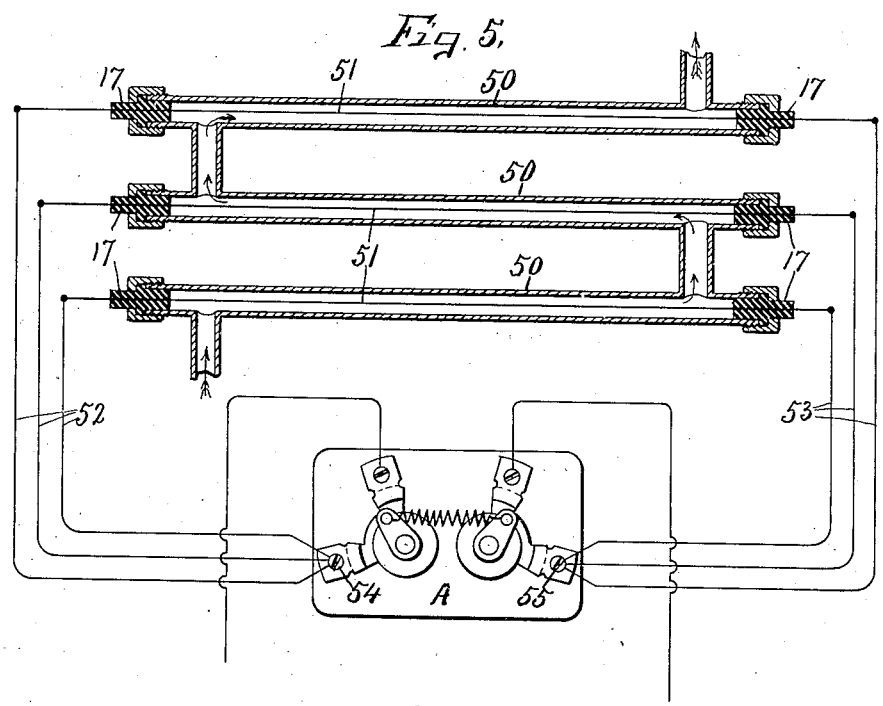
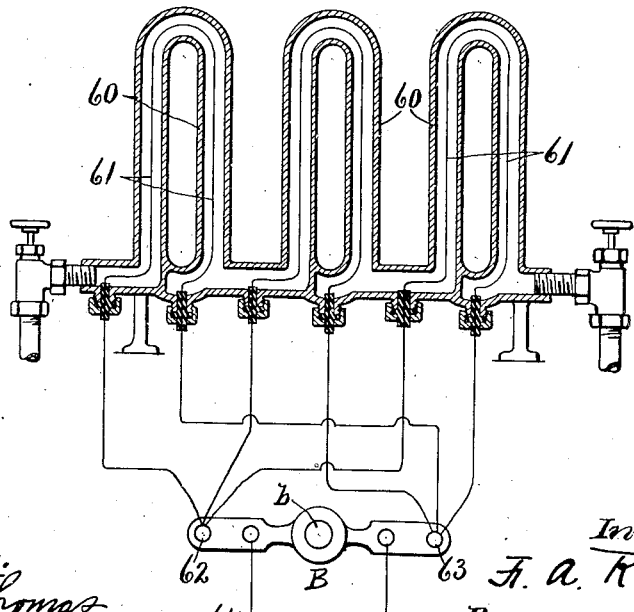

FRANK A. ROBINSON, OF ALBANY, NEW YORK, ASSIGNOR TO WILLIAM G. VAN LOON, OF ALBANY, NEW YORK.

ELECTRIC WATER-HEATER.

965,333.

Specification of Letters Patent. Patented July 26, 1910.

Application filed June 7, 1909. Serial No. 500,635.

*To all whom it may concern:*

Be it known that I, FRANK A. ROBINSON, of Albany, in the county of Albany, in the State of New York, have invented new and useful Improvements in Electric Water-Heaters, of which the following, taken in connection with the accompanying drawings, is a full, clear, and exact description.

This invention relates to certain improvements in electric water heaters involving the use of a plurality of conduits or pipes connected in series and a corresponding number of electric heating conductors passed through the water conduits and electrically connected in parallel or multiple in an electric heating circuit or to an electric switch which is connected in such circuit, each conductor threading one of the heating pipes and being provided with a thin coating of insulating material to prevent electrical transmission of the current from the conductor to the water, and at the same time is of such character as to permit radiation of the heat from the conductor to such water for heating the latter while in transit through the water pipes.

The main object of my present invention is to produce a maximum heating efficiency with a minimum amount of electric current, or in other words to heat the water more expeditiously and to a higher temperature while passing through the pipes than would be possible by connecting the heating conductors for the several water pipes in series or continuous throughout the entire system of water pipes.

Another object is to provide means whereby the water supply and current leading to the water heater may be turned on or off simultaneously, or the water turned on or off without closing the circuit through the electric heating conductors.

Other objects and uses relating to specific parts of the apparatus will be brought out in the following description.

In the drawings—Figure 1 is a vertical sectional view of an electric water heating apparatus embodying the various features of my invention. Figs. 2 and 3 are transverse sectional views taken respectively on lines 2—2 and 3—3, Fig. 1. Fig. 4 is a detail sectional view taken on line 4—4, Fig. 1, showing particularly the upper end of the water feed pipe and adjacent end of the pipe coil leading therefrom, together with one end of one of the electric conductors which passes through said coil. Fig. 5 is a sectional view of a plurality of, in this instance three, water pipes connected in series and a corresponding number of electric heating conductors passing through said pipes and connected in parallel or multiple to an electric switch. Fig. 6 is a sectional view of a radiator and my improved system of electrically heating the water passed therethrough. Fig. 7 is an elevation of a portion of the heating wire, showing the insulating coating.

In Fig. 1 is shown an electric water heater adapted for lavatories, barber shops and similar places where hot or cold water is required. This water heater comprises a water base —1—, a plurality of, in this instance three, water pipe coils —2—, —3— and —4— and a corresponding number of electric heating conductors —5—, —6— and —7—, threaded or passing through their respective pipe coils —2—, —3— and —4—, and each provided with a thin coating —8— of insulating material. The water base —1— is, in this instance, secured to a suitable support —9— and is provided with an inlet chamber —10— and an outlet chamber —11—, the inlet chamber —10— being connected to a supply pipe —12—, while the outlet chamber —11— is provided with a suitable discharge nozzle —13—, from which the hot or cold water may be drawn for use.

The inlet chamber —10— is connected by an upflow pipe —14— to the upper end of the inner pipe coil —2—, the connection between the upflow pipe —14— and pipe coil being made by means of a T coupling —15— and suitable gland or stuffing box —16—, said coupling being provided with a bushing —17— of insulating material, such as porcelain or asbestos composition, capable of resisting disintegration or injury by the heat of the electric heating conductor, as —5—, which is passed therethrough.

The lower end of the inner pipe coil —2— is connected by a branch pipe —18— to the adjacent lower end of the intermediate pipe coil —3—, as best seen in Fig. 3, and has its upper end connected by a similar branch pipe —19— to the adjacent upper end of the outer pipe coil —4—, as best seen in Fig. 2. These pipe coils are arranged one within the other for compactness and economy of space, and at the same time permitting the use of the desired length of pipe to heat the water to the temperature required.

The object in providing a plurality of pipe coils connected in series in the manner described is to enable the heating conductors to be more easily threaded therethrough in such lengths as may give the maximum heating efficiency under a minimum amount of electric current, and at the same time this arrangement allows the ends of the heating conductors to be more readily connected in parallel or multiple to the current supply and return wires, as —20— and —21—.

The terminal end of each coil is connected to a coupling —15— similar to that shown in Fig. 4, and each coupling is provided with a bushing —17— of insulating material capable of resisting disintegration by the heat of the heating conductors —5—, —6— and —7—, which are passed through the coils —2—, —3— and —4— respectively.

The ends of each heating conductor which extend through the insulating bushing —17— are connected to suitable binding posts —22—, to which the corresponding ends of the conductors —20— and —21— are attached, as best seen in Figs. 2 and 3.

The circuit wires —20— and —21—, which are of opposite polarity, are connected to terminals —23— and —24— of an electric switch having movable contact members —25— and —26—, by which the terminals —23— are electrically connected to, and disconnected from, additional binding posts —27— and —28—, the latter being connected by wires —29— and —30— to any source of electric energy not necessary to herein illustrate or describe.

The water supply pipe —12— is provided with a controlling valve —31— having a suitable operating handle (not shown), said valve being provided with a valve stem —32— having a crank arm —33— which coacts with a switch operating member —34— to control the operation of the electric switch as the valve in the water supply pipe is opened and closed.

In Fig. 1 the valve —31— in the supply pipe is shown in its open position and as having closed the electric switch for heating the electric heating conductors —5—, —6— and —7— for heating the water as it passes through the coils —2—, —3— and —4— so that hot water is discharged at the nozzle —13—.

The movable contact members —25— and —26— are operated simultaneously through the medium of intermeshing toothed segments —35— and —36—, which in turn are actuated by the reciprocatory movement of the operating member —34— during a quarter turn of the valve stem —32— and crank arm —33— in opening and closing the valve, said contact members —25— and —26— being operated with a quick snap action by means of a spring —37— having its opposite ends connected to crank arms —38— coaxial with and connected to the toothed segments —35— and —36—, the spring being movable through and to opposite sides of a medial line drawn between the axes of said segments to produce the desired snap action and to hold the switch members in their adjusted positions.

The connections between the valve stem —32— and switch operating member —34— are such that when the valve is turned a quarter turn from its closed position in one direction it will open the waterway through the supply pipe to the heater coils and close the electric switch for heating the water while in transit through the pipe coils, but when the valve is turned a quarter turn in the opposite direction from its normally closed position, the water passage through the supply pipe will also be opened but the electric switch will remain open, thereby allowing the cold water to pass through the pipe coils and discharge nozzle —13— without heating. This action of the electric switch is brought about by providing the operating member —34— with a slot —40—, one end of which is curved and concentric with the axis of the valve stem —32— when the crank arm —33— is in the position shown by dotted lines in Fig. 1, or at right angles to the position shown by full lines, in which position the switch operating member —34— has been shifted to open the switch, the opposite end of the slot being disposed at substantially right angles to the line of movement of the operating member —34—. This slot receives a pin or projection —41— on the crank arm —33— so that when the switch operating member —34— is in the position shown by dotted lines and the crank arm —33— is turned from its dotted position to the position shown by full lines, the projection —41— will ride against the sides of the slot —40— and thereby draw the operating member —34— rearwardly to close the switch for supplying hot water at the nozzle —13—. On the other hand, if the operating member —34— and crank arm —33— are in the position shown by dotted lines, in which position the curved right hand end of the slot —40— is concentric with the axis of the valve stem —32—, and cold water is desired at the nozzle —13—, the valve stem —32— and its crank arm —33— will be turned to the right, during which operation the pin —41— will simply ride in the curved end of the slot —40— without affecting the operation of the switch, thus leaving the switch open and permitting the cold water to pass through the coils and out at the nozzle —13—.

When the valve —31— is closed to cut off the water supply, the crank arm —33— and operating member —34— will assume the position shown by dotted lines in Fig. 1, thereby opening the electric switch and cutting off the water supply to the pipe coils and stopping the water pressure upon said pipe coils when the device is not in use, which is an important feature of my invention, because it not only relieves the entire system of coils from unnecessary strains from the water pressure, but also cuts out the electric current from the heating conductors, thereby increasing the life and safety of the entire heating device.

I have shown and briefly described a particular form of electric switch coacting with the valve —31— to control the water supply and electric current to the heater, but many other forms of electric switches may be similarly adapted for this use, and, therefore, I do not herein claim any particular form of switch except one that may be operated by and simultaneously with the operation of the water controlling valve and adapted to be used in connection with a plurality of heating conductors which are connected in parallel or multiple in the electric circuit. Furthermore I do not limit myself to the use of heating conductors connected in parallel or multiple in connection with pipe coils, as such conductors may be passed through straight pipes —50—, as shown in Fig. 5, such pipes being connected in series and provided at their ends with suitable bushings —17— of insulating material similar to those shown in Fig. 4, and through which the ends of the heating conductors, as —51—, are passed, said conductors being connected in parallel or multiple by wires —52— and —53— of opposite polarity to corresponding terminals —54— and —55— of an electric switch —A— which may be the same as that shown in Fig. 1.

In Fig. 6 I have shown a hot water radiator consisting of a series of loops or water conduits —60— also connected in series, and a corresponding number of heating conductors —61— connected in parallel or multiple with a suitable electric switch —B—, this latter switch consisting simply of a rock arm centrally pivoted at —b— and adapted to close the circuit between terminals —62— and —63— of the heating circuit with conductors —64— and —65— which may be connected to any source of electric energy for supplying the current to the heating conductors.

What I claim is—

1. An electric water heater comprising a plurality of water conducting pipes independent of each other, a water supply pipe, coupling means for connecting one of said conducting pipes to said supply pipe, a discharge pipe, coupling means for connecting the other conducting pipe to said discharge pipe, a binding post carried by each terminus of each of said conducting pipes, an insulated electric heating conductor extending through one of said pipes and connected to the binding post carried thereby, an insulated electric heating conductor extending through the other of said pipes and connected to the binding post carried thereby, a circuit wire having one end thereof attached to the binding post at one terminus of each of the conducting pipes, a circuit wire having one end thereof attached to the binding post at the other terminus of each of the conducting pipes, an electric switch connected to the other ends of said circuit wires for opening and closing the circuit, and a valve for opening and closing the water supply pipe.

2. An electric water heater comprising a plurality of water conducting pipes independent of each other, a water supply pipe, coupling means for connecting one of said conducting pipes to said supply pipe, a discharge pipe, coupling means for connecting the other conducting pipe to said discharge pipe, a binding post carried by each terminus of each of said conducting pipes, an insulated electric heating conductor extending through one of said pipes and connected to the binding post carried thereby, an insulated electric heating conductor extending through the other of said pipes and connected to the binding post carried thereby, a circuit wire having one end thereof attached to the binding post at one terminus of each of the conducting pipes, a circuit wire having one end thereof attached to the binding post at the other terminus of each of the conducting pipes, an electric switch connected to the other ends of said circuit wires for opening and closing the circuit, a valve for opening and closing the water supply pipe, and connections between the valve and switch whereby when the valve is opened the switch is closed and when the valve is closed the switch is opened, and means whereby said valve is permitted to have an additional movement relative to said connections whereby the valve may be opened independently of said connections when the switch is opened.

3. An electric water heater comprising a water supply pipe, an upflow pipe communicating with the supply pipe, a water conducting pipe having one end coupled with the upper end of the upflow pipe, a binding post carried at the inlet end of the water conducting pipe, a binding post carried by the outlet end of said water conducting pipe, an electric conductor having its ends attached to the binding post and extending through said water conducting pipe, a circuit wire attached to one of said binding posts, a circuit wire attached to the other of said binding posts, a second water conducting pipe, coupling means between the outlet end of the first conducting pipe and the inlet end of the second conducting pipe, a binding post mounted at the inlet end of the second conducting pipe, a binding post mounted at the outlet end of the second conducting pipe, an electric heating conductor extending through the second conducting pipe and having its ends connected to the binding post carried by said pipe, a circuit wire connected to each of the binding posts of the second conducting pipe, means for opening and closing the supply pipe, an electric switch connected to the circuit wires for opening and closing the circuit, and means for discharging water from the second conducting pipe.

4. An electric water heater comprising a plurality of water conducting pipes, each independent of each other and each provided at each of its ends with a binding post, an electric conductor extending through each of the conducting pipes and having its ends connected to the binding posts of said pipes, a pair of circuit wires connected to the binding posts of each of said conducting pipes, means for coupling the inlet end of one of the conducting pipes with a water supply, means for coupling the outlet end of the last-mentioned pipe to the inlet end of another pipe for establishing communication between the two pipes, means for withdrawing water from the last-mentioned conducting pipes, means for opening and closing the water supply, and means for opening and closing the electric circuit.

5. An electric water heater comprising a plurality of water conducting pipes each independent of the other, coupling means between said pipes, an electric heating conductor extending through each of said pipes, said conductors free of said coupling means, a pair of binding posts carried by each of said pipes for its respective conductor, independent circuit wires connected to the ends of said electric conductors, means for controlling the supply of water to said conducting pipes, a switch for opening and closing the electric circuit, and means whereby the control of the water can be had independently of the closing of the circuit.

6. An electric water heater comprising a plurality of water conducting pipes each independent of the other, an upflow pipe connected to one of said conducting pipes, a discharge nozzle connected to one of the other of said pipes, an independent electric heating conductor extending through each of said pipes and having its ends connected to the ends of its respective pipe, means connected with the ends of each conductor for forming a circuit, a water supply communicating with said upflow pipe, means for controlling the circuit, and means for controlling the water supply.

7. An electric water heater comprising a plurality of independent water conducting pipes, means for supplying water to one of said pipes, means for withdrawing water from another of said pipes, electric heating conductors extending through said pipes, said conductors independent of each other, independent circuit forming wires for each of said conductors, and means for supplying water to said pipe simultaneously with the closing of the circuits.

8. An electric water heater comprising a plurality of independent water conducting pipes, means for supplying water to one of said pipes, means for withdrawing water from another of said pipes, electric heating conductors extending through said pipes, said conductors independent of each other, independent circuit forming wires for each of said conductors, means for supplying water to said pipe simultaneously with the closing of the circuits, and means whereby water is supplied to said pipes when the circuit is opened.

9. An electric water heater comprising a plurality of water conducting pipes connected in sequence for serial operation, means for supplying water to one of the pipes, means for withdrawing water from another pipe, electric heating conductors extending through the pipes and connected in parallel.

10. An electric water heater comprising a plurality of water conducting pipes connected in sequence for serial operation, means for supplying water to one of the pipes, means for withdrawing water from another pipe, electric heating conductors extending through the pipes and connected in parallel, means for supplying water to said pipes simultaneously with the closing of the circuits, and means whereby water is supplied to said pipes when the circuit is open.

In witness whereof I have hereunto set my hand this second day of June, 1909.

FRANK A. ROBINSON.

Witnesses:
W. R. FREDERICK,
SHERMAN A. MURPHY.